United States Patent [19]

Marquardt et al.

[11] 4,033,874

[45] July 5, 1977

[54] APPARATUS FOR THE TREATMENT OF LIQUIDS

[75] Inventors: Kurt Marquardt, Holzgerlingen; Reinhard Buchholz, Wendlingen, both of Germany

[73] Assignee: Hager & Elsaesser, Stuttgart, Germany

[22] Filed: Apr. 22, 1975

[21] Appl. No.: 570,926

Related U.S. Application Data

[63] Continuation of Ser. No. 362,953, May 23, 1973, abandoned.

[30] Foreign Application Priority Data

May 26, 1972 Germany .................. 2225682
Sept. 23, 1972 Germany .................. 2246792

[52] U.S. Cl. ........................... 210/189; 210/268
[51] Int. Cl.² .................................. B01D 33/30
[58] Field of Search ............. 210/27, 28, 33, 34, 210/64, 189, 195, 202, 259, 268, 269, 25, 26, 275; 208/310 Z; 23/270 R

[56] References Cited

UNITED STATES PATENTS

| | | | |
|---|---|---|---|
| 2,412,135 | 12/1946 | Evans | 210/268 X |
| 2,614,133 | 10/1952 | Ockert | 210/33 X |
| 2,693,395 | 11/1954 | Berg | 210/33 X |
| 2,788,899 | 4/1957 | Cover | 210/195 X |
| 2,882,912 | 4/1959 | Reeg et al. | 210/268 X |
| 2,951,036 | 8/1960 | Bodkin et al. | 210/33 X |
| 3,208,934 | 9/1965 | Kingsbury | 210/189 X |
| 3,627,133 | 12/1971 | Rak | 210/98 |
| 3,658,699 | 4/1972 | Ryan et al. | 210/189 X |
| 3,915,861 | 10/1975 | Marquardt | 210/189 |
| 3,920,544 | 11/1975 | Weiss | 210/33 X |

FOREIGN PATENTS OR APPLICATIONS 569,534  1/1959  Canada ............... 210/33

*Primary Examiner*—Thomas G. Wyse
*Assistant Examiner*—Ivars Cintins
*Attorney, Agent, or Firm*—William Anthony Drucker

[57] ABSTRACT

A process for the separation of solids from liquids in a closed pressure system, wherein liquid is passed through a treatment column containing purifying material. A portion of the purifying material is removed in a timed intermittent quasi-continuous manner and cleaned in a rinsing column. The cleaned purifying material is then fed back to the treatment column by backflushing and the use of a liquid transport medium.

1 Claim, 10 Drawing Figures

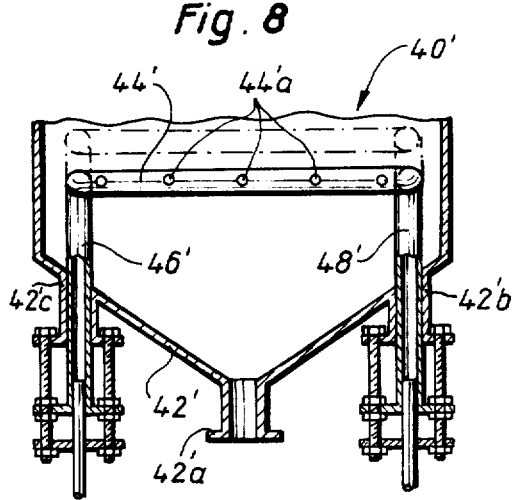
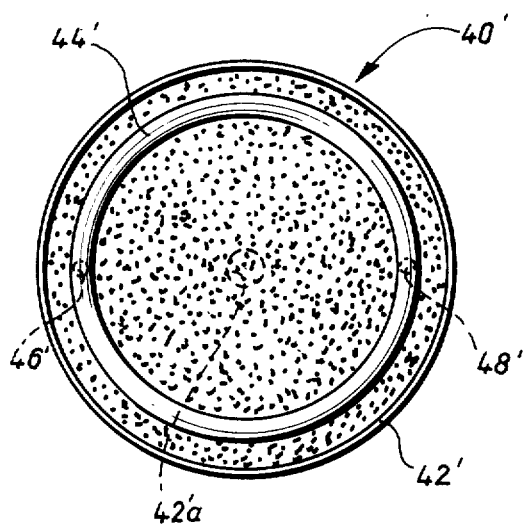
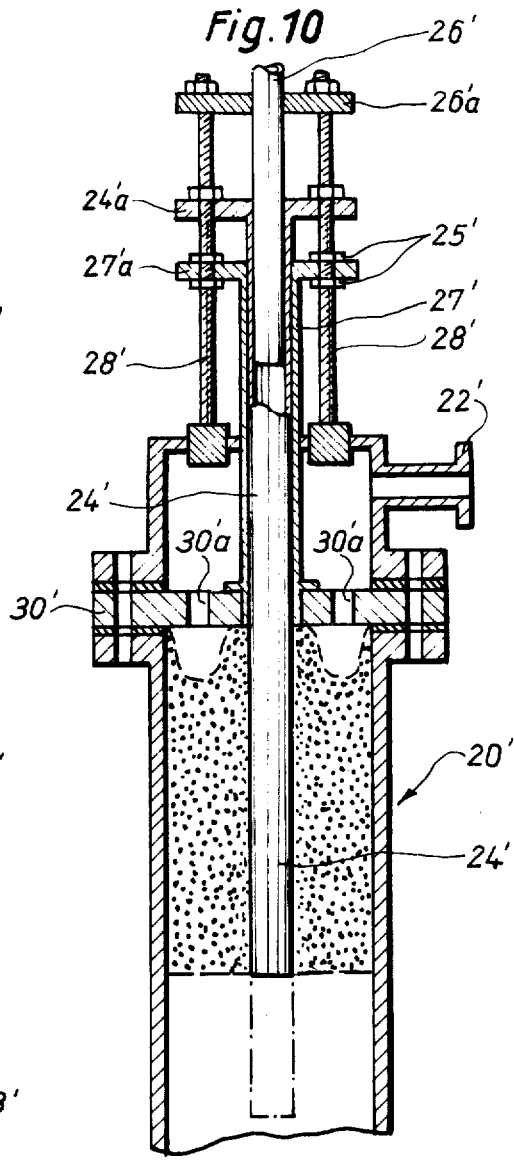

APPARATUS FOR THE TREATMENT OF LIQUIDS

This is a continuation of application Ser. No. 362,953, filed May 23, 1973, now abandoned.

BACKGROUND OF THE INVENTION

1. Field of the Invention

This invention relates to an apparatus for the separation of finely divided and/or dissolved substances and solids out of liquids, especially water, in which the liquid to be purified flows through a treatment column filled with filtering and/or adsorbing material.

Such apparatuses, hereinafter referred to merely as "adsorber installations" for the sake of simplicity, which can contain adsorbing and/or filtering substances, serve by way of example for the purification of industrial waters, drinking water, surface water, bath water, cooling water, generally for the purification of waters fit for use. Further fields of use of such installations are the prepurification stages of industrial, rinsing or other waters which are worked up further in subsequent stages by conventionally or continuously working ion exchanger installations.

2. Description of the Prior Art

The dirt-absorption capacity and thus the working time of filters of conventional construction is limited, especially in the case of filtration of liquids having a high proportion of solids or suspended substances. The interruption of operation of such filter plant for the purpose of cleaning, that is back rinsing, is especially troublesome if the working up of the water by means of ion exchanger installations takes place continuously or almost continuously, that is where the regeneration and rinsing of the ion exchanger masses is effected outside the treatment column and the freshly regenerated ion exchanger mass is returned in the cycle into the treatment column. In this case in fact there is no interruption of operation for the purpose of regeneration of the ion exchanger masses, as in the conventional methods. In order to avoid an interruption of operation when using filter installations, hitherto with such a continuous manner of operation it was necessary to set up at least two filter assemblages so that in the case of back-rinsing of the one working filter the other filter held in reserve could be put into use.

In the conventional processes charged adsorber material must be replaced by a fresh filling since it is no longer usable. If the adsorbed materials are for example tensides, aliphatic or aromatic compounds, complete removal of the gathered organic substances is not possible. For this reason use is made of special process by treatment with solvents. The consumption of solvents amounts to about 1.5 to three times the volume of the adsorber material. In the case of a filer containing for example 200 liters of adsorber material, in the former processes it is necessary to wash with the minimum of about 300 liters of solvents, so that in the case of large units the treatment is very expensive. It can also be seen that the handling of such large quantities of solvents is expensive on account of the amount of apparatus required to be used and is problematical on account of the necessary protective measures.

SUMMARY OF THE INVENTION

The invention is based upon the problem of eliminating these disadvantages and producing an extremely economically working adsorber installation with high efficiency, also a process for the operation thereof.

The invention is further based upon the problem of subjecting the adsorber materials, after flushing, to a special treatment with solvents in order in an economical manner to separate out substances which are deposited from the liquid to be worked up and are difficult to remove.

It is the object of the invention to provide an apparatus for the separation of finely divided and/or dissolved suspended substances and solids out of liquids which can be carried out without great expense for apparatus and without the described disadvantages and is also economical and environmentally acceptable.

According to the invention this problem is solved by a process comprising passing untreated liquid through a treatment column containing a bed of liquid purifying material to leave the column as purified liquid; intermittently removing successive portions of said purifying material from the treatment column by means of a liquid transporting medium; treating the portions of the purifying material with a solvent of some at least of said impurities in an extracting column, mixing said portions with further liquid transporting medium and transporting the mixture into a washing column; washing the solvent out of said portions in said column, intermittently returning said portions successively to the treatment column; subjecting the solvent to a distillation process to purify the same and returing the solvent to storage means for re-use; adjusting the volume of the portions of the purifying material removed from the treatment and washing columns so that the volume of purifying material removed from the washing column is greater than the volume of purifying material removed from the treatment column; and maintaining the material in said treatment column, extracting column and washing column as a closed system under pressure.

The invention also comprises an apparatus for carrying out this process. In such installations the adsorption zone can be adjusted optimally in the treatment column, since fresh, that is uncharged, adsorber material is regularly fed to the top of the treatment column. The charged zone situated in the region of the entry of the unpurified liquid is withdrawn at intervals, so that in comparison with the conventional filtration processes a more uniform purification effect is achieved. This process further has the advantage that the volume of adsorber material to be used in the treatment column can be kept substantially smaller than in the case of stationary filter beds. In contrast to the conventional processes the position and the volume of the adsorption zone hardly change, since the treatment column is constantly replenished from above with fresh filter material. On account of these advantages the invention makes use of a continuous or almost continuous process, while there is the further advantage that the treatment with solvents is unproblematical and inexpensive with such a process, since relatively small batches of adsorber material are constantly charged and have to be treated.

Thus according to an advantageous further development of the invention it is provided that the adsorber material is treated after the flushing process with a suitable solvent which may be washed out of the adsorber material before its return into the treatment column, while the solvent in turn is subjected to distillation for purificaton and supplied in the cycle for re-use.

This process is especially advantageously suitable for adsorber materials which normally can be regenerated only with great difficulty if at all, for example, those which are free of active groups. If such an adsorber material is charged with liquid, for example water, which contains tensides of all kinds, emulsified greases, oils, phenols and derivatives thereof, heating oils, fuels or the like, according to the invention these substances are separated out of the liquid in an economical manner.

So that the solvent may act especially effectively upon the adsorber material, the latter is expediently superficially dehydrated before treatment. The process is especially economical because in accordance with the invention the solvent after use is evaporated, condensed and supplied continuously or discontinuously for the renewed use. Thus only small quantities of solvent are ever required, so that the apparatus expense can be kept small. It is provided that the solvent still situated in the adsorber material after the treatment is displaced with inert gas, which may be warmed, or with air, and in turn the gas or air is freed of solvents and supplied for re-use.

The degree of separation for solids and organic-contained substances can be increases substantially if in accordance with the invention a filtraton aid, flocculation aid and/or flocculation medium is mixed into the liquid to be worked up.

As adsorber material there is preferably provided an inactive substance, such as polystyrene, the specific weight of which is not substantially greater than one, so that in the upward flow of the liquid to be filtered the adsorber material can be kept in suspension. Instead it is also possible to use active or inactive ion exchanger material, since this is especially suitable for fine filtration.

The process according to the invention is operated preferably with a quasi-continuously working installation in which volume-adjusting devices are provided in the bottom of the treatment column and the head parts of the rinsing and washing columns, the depth of immersion of which devices in the column determines the volume of the batch to be withdrawn. The volume-adjustment devices may consist for example in the installation of a crude water distributor in the treatment column, while the funnel-shaped bottom space situated beneath the distributor determines the volume of the batch. In the rinsing and washing columns these volume adjustment devices are extraction pipes which are fitted in the head part of the column. The volume of the adsorber mass to be withdrawn from the rinsing and washing columns is determined with the adjustment of the depth of immersion of these extraction pipes, in that on forcing in of transport water that part of the adsorber mass is withdrawn from the column which is situated in the head part of the column as far as the level of the depth of immersion of the extraction pipe.

According to a further development of the invention it is provided that these volume adjustment devices are adjustably arranged, in that they are adjustably and securably arranged on at least one pipe, protruding from the exterior into the column, within at least one pipe.

BRIEF DESCRIPTION OF THE DRAWING

FIG. 8 shows a modification of the example of embodiment according to FIG. 7, FIG. 9 shows a plan view of the column part according to FIG. 8, FIG. 10 shows a section through a part of the installation as indicated by the circle B in FIG. 6.

DESCRIPTION OF THE PREFERRED EMBODIMENTS

Figure 1:
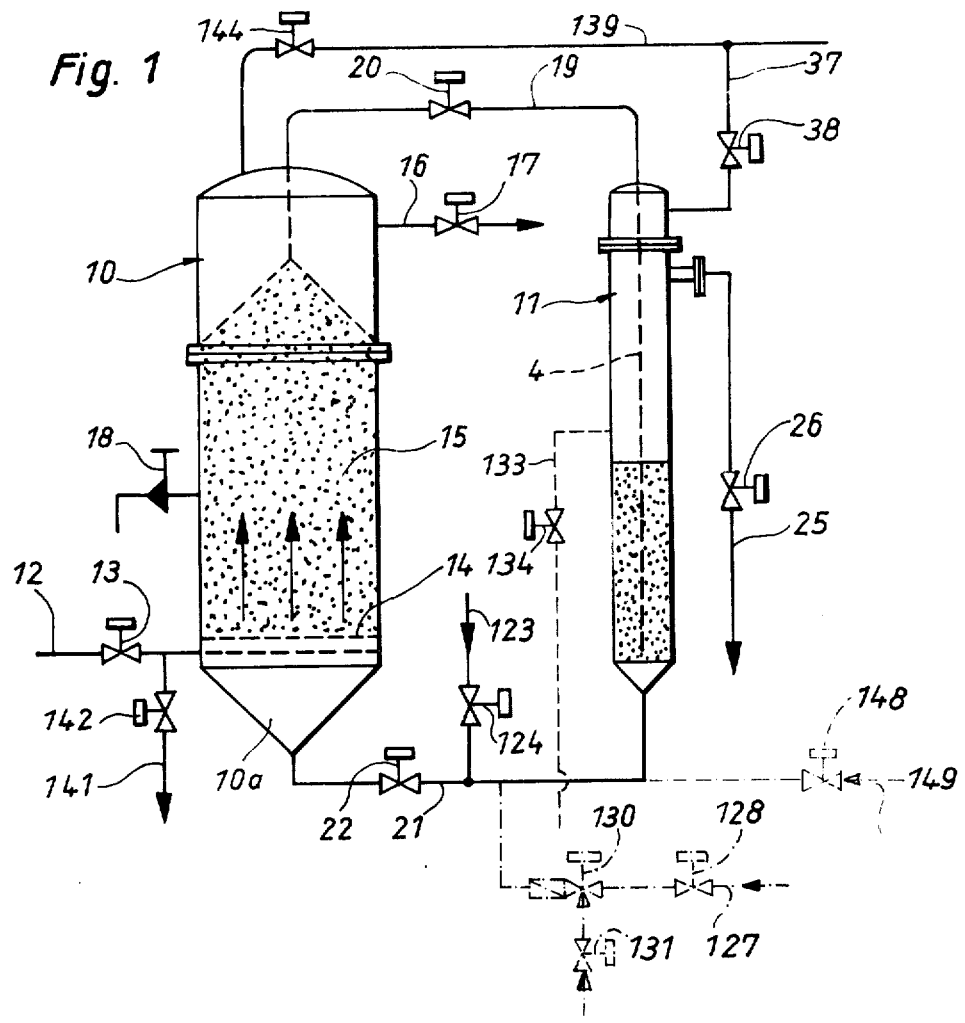
FIG. 1 shows a diagrammatic representation of a filtration plant according to the invention with treatment and rinsing columns.

The crude product to be purified will hereinafter be called "untreated water" for the sake of simplicity. This may be aqueous solutions or other solutions in non-aqueous liquids. The untreated water is admitted through the conduit 12, in which a valve 13 is provided, into the treatment column designated as a whole by 10. The treatment column is filled with adsorbing material 15 and has measurement positions 18 for the measurement of the degree of turbidity of the water to be filtered. The pure product, hereinafter called "pure water" for the sake of simplicity, leaves the column 10 through a pure water conduit 16 controllable by means of a valve 17. The liquid flows through the adsorption material 15 with a specific speed, the solid or suspended substances contained in it being retained in the filter bed according to the size of the particles. With increasing duration of operation the adsorber material 15 is heavily permeated with dirt particles, especially in the region of the untreated water entry. This soiling is measurable for example by the rise of the filter differential pressure between untreated water entry and pure water exit. The degree of soiling can also be ascertained continuously or at time intervals by photometric measurement of the turbidity of liquid samples which are taken by one or more valves 18 fitted at different levels in the filter container.

On exceeding a predetermined differential pressure or turbidity value and/or at predetermined time intervals or after the passage of a specific quantity of liquid, the treatment column is briefly set out of action by closure of the valve 13 in the untreated water conduit 12. At this time interval a filter material batch freed of the soiling substances by rinsing in the rinsing columns 11, that is a partial quantity of the filter material withdrawn previously from the treatment column, is fed to the treatment column 10 through the conduit 19 and the valve 20. After this batch has entered the treatment column 10, the latter is set in operation again by opening of the valve 13 and inflow of the liquid to be filtered.

During the beginning of this operational phase a dirt-laden batch of filter material is situated in the funnel-shaped bottom part 10a of the treatment column beneath the untreated water distributor 14. This batch is then conducted through the conduit 21 and the valve 22 into the rinsing column 11. The required rinsing water flows through a conduit 123, controllable by means of a valve 124, from beneath into the rinsing column 11. The rinsing column 11 is so dimensioned that expansion of the filter material volume can take place by 75–100%, so that the soiling substances can be completely removed and let off through the conduit 125 after the opening of the valve 126.

If the medium to be filtered, for example water, is only moderately soiled, it can be used for the rinsing of the soiled filter material batch. If on account of the degree of soiling the untreated water cannot be used for rinsing, it is necessary to rinse with pure water. The low rinsing water requirement, necessary in this plant in contrast to conventional filters, also permits rinsing with pure water from the economic viewpoint. If the filter plant as described is placed before a continuously working ion exchanger complete de-salination plant, the possibility also exists of collecting the continuously occurring cationic or anionie regenerate and using it for rinsing. This is expedient especially if the soiling substances in alkaline or acid medium are more easily detached from the filter material, for example removal of lime deposits in the case of use of acid regenerate.

In the case of a high degree of soiling it is expedient if rinsing air is admitted to the rinsing column 11 from beneath to loosen the filter mass. The rinsing air connection, intended especially also for large installations, is entered in dot-and-dash lines.

The rinsing water is admitted to the transport conduit 21 through the conduit 127 in which the valve 128 is provided. It sucks rinsing air in continuously through an ejector 130, before which a valve 131 is connected. For this case it is provided that the water situated above the filter mass in the rinsing column 11 is let off through a conduit 133 in which there lies a valve 134.

The withdrawal of the partial quantity of filter material takes place through a dipping pipe 4 arranged in the axial direction in the rinsing column 11. For conveying, transport water is admitted from above into the rinsing column 11 through the conduit 37 by opening of the valve 38. The filter mass is then forced into the dipping pipe 4 and introduced into the transport conduit 19. Since the rinsing column is intended to receive only one single batch of filter material, the pipe extends into the region of the bottom of the rinsing column 11.

In order to remove the filter materials (fines) which have settled in the upper distributor and withdrawal system of the treatment column, shock flushing is provided. For this purpose of conduit 139 is connected to the head piece of the treatment column 10 and can be opened and closed by means of a valve 144. Directly before admission of the cleaned filter material through the conduit 19, a water current opposite to the pure water current 16 is admitted through the head of the treatment column 10 from above downwards into the treatment column, which current washes the upper nozzle space of the treatment column 10 clear. The water admitted through the conduit 139 can be pure water. This conduit is connected with the transport water conduit 37.

On the untreated water conduit 12 before the entry into the treatment column an outflow conduit 141 is provided in which a valve 142 is provided for the outflow of relief water in the described shock flushing. For some purposes, for example, in the filtration of drinking water, it is expedient if during the back rinsing sterilizing agent is regulated into the rinsing column 11 for example through a conduit 149 controllable by means of a valve 148, so that no germ contamination of the filter material can occur.

Figure 2:
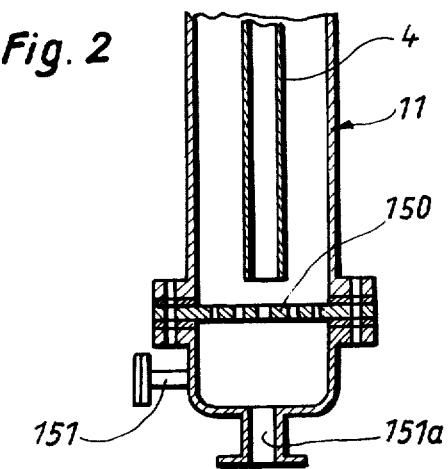
FIG. 2 shows a partial section through the lower part of a rinsing column modified in accordance with FIG. 1.

For the uniform distribution of the rinsing water and thus to improve the rinsing process, a perforated plate 50 can be installed in the back rinsing column 11, as may be seen from FIG. 2. The rinsing water is supplied through the conduit 151, while the filter material enters through the inlet connection 151a. This perforated plate is of such nature that it possesses openings of different diameters, the size of the diameter decreasing from the interior outwards. Thus margin concentration and channel formation in the rinsing column can be avoided and the consumption of rinsing water can be reduced. The filter mass will penetrate especially through the large bores. Otherwise in FIG. 2 the same parts are provided with the same reference numerals as in FIG. 1.

As filter material there is preferably selected one having a spherical form, so that minimum possible abrasion occurs in transport in the filter mass. An inactive filter substance is preferably suitable, such as synthetic plastics granulates, for example polystyrene, activated charcoal, coke, anthracite, the specific weight of which is not substantially greater than 1. Thus in the upward flow of the water to be filtered it is held in suspension or a solid bed is formed. Porous exchange material, such as special carbon etc. is also suitable. Moreover active or inactive ion exchanger material is also suitable, since this has advantages for fine filtration. By the use of very fine-grained, inactive ion exchanger material with a grain size of 0.3 to 1 mm. diameter a very good filtration effect is achieved with filter speeds greater than 30 m/h. Moreover a filter material with chemical polar groups can be especially suitable, which groups in fact do not chemically influence the medium to be filtered but nevertheless effect a favourable influencing of the filtration operation by the electric charge.

The charging of the adsorber bed with solids can be several times greater than that of conventional filters, since the number per unit of time for the supply of the freshly rinsed and the removal of the soiled filter material is limited only by the transport and rinsing times. While in filters of conventional construction in the case of heavy soiling a frequent interruption takes place for the purpose of re-rinsing the adsorbed solids of operation, the described filter has the advantage that almost continuous operation is ensured with comparatively very short interruption. In conventional filters the back rinsing and filtering-in time last about 2 to 4 hours, while in the filter plant as described only an extremely brief phase of interruption is necessary for the transport of the batch, since the soiled filter material is externally cleaned and the freshly rinsed filter material is returned in the cycle and thus the filter bed of the treatment column is continuously supplemented and compensated by rinsing of the soiled partial filter material batch. Long flushing and filtering-in times are thus eliminated in the filter operation as described. Moreover in contrast with conventional installations where at least two filter assemblages must be present for continuous operation, it is possible with one single filter assemblage to guarantee the supply of pour water. The investment costs and space requirement (saving of the second assemblage) are thus lower.

Despite higher gathering of sludge, the rinsing water consumption is reduced to a fraction in comparison with conventional filters, since only the heavily soiled zone is withdrawn and rinsed, but not the entire filter batch as hitherto. Since the filtering speed is greater than in conventional filters, a smaller construction style of the filter container is possible with equal performance. Moreover the efficiency in the described filter can be improved over the filter method known hitherto, since by the supply of freshly rinsed filter material at the pure water exit and withdrawal of the soiled filter mass at the untreated water entry, the mass is conveyed slowly, that is to say in timed intermittent manner and by portions, in counter-current to the medium to be filtered. Thus the filter material remains loose and in the main soiling zone no caking occurs as in conventional filters.

The cycle time depends upon the solid content of the liquid to be filtered (suspended substances) and can lie in the order of magnitude between 15 minutes and several hours. If the filter plant as described is placed before a continuously working ion exchanger plant for the working up, for example partial and complete desalination, of water, the cycle time can be adapted to that of the ion exchanger plant. However here the rinsing time in the rinsing column 11 will expediently be adjusted according to the degree of soiling of the filter materials, so that several cycle intervals can be provided for the washing operation.

Figure 3:
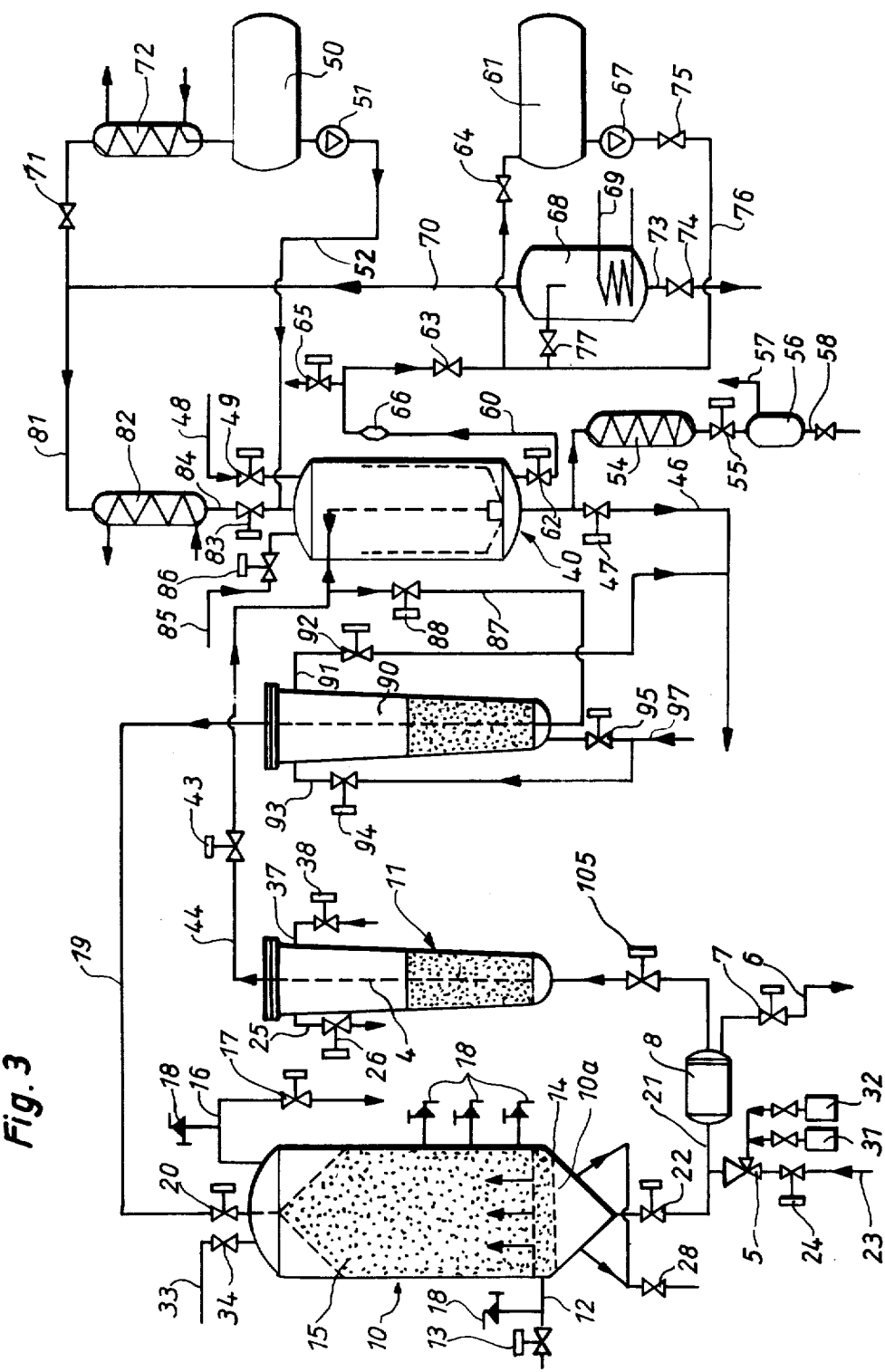
FIG. 3 shows the diagrammatic representation of an installation according to FIG. 1 in which the adsorber material is treated with a solvent which in turn is purified by distillation and supplied for re-use.
Figure 4:
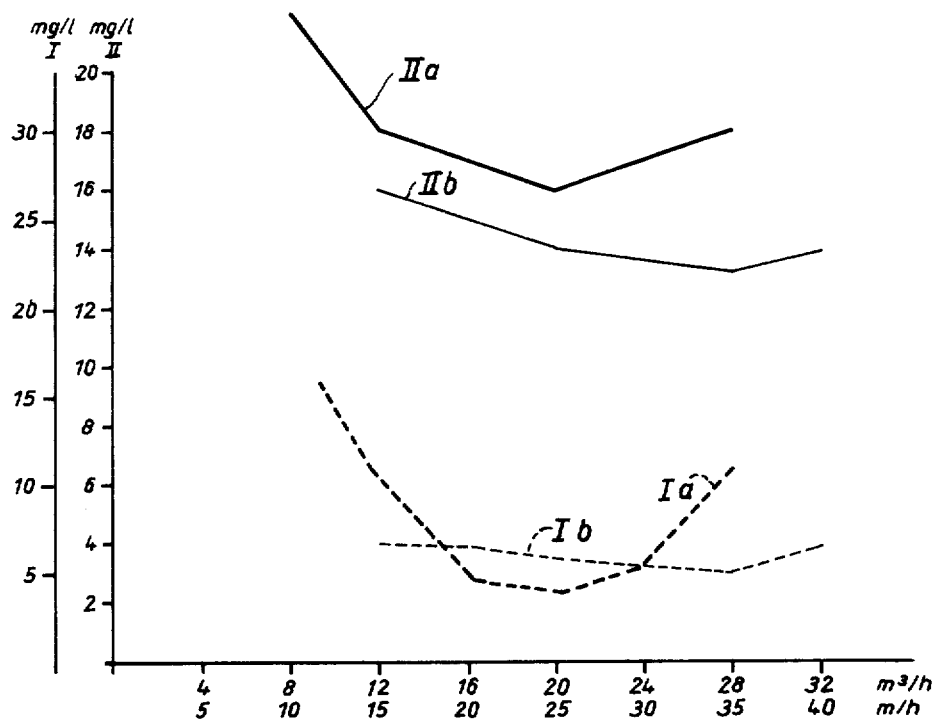
FIG. 4 shows a graph of a filtration of river water in the case of direct filtration and after the addition of filtration aids.
Figure 5:
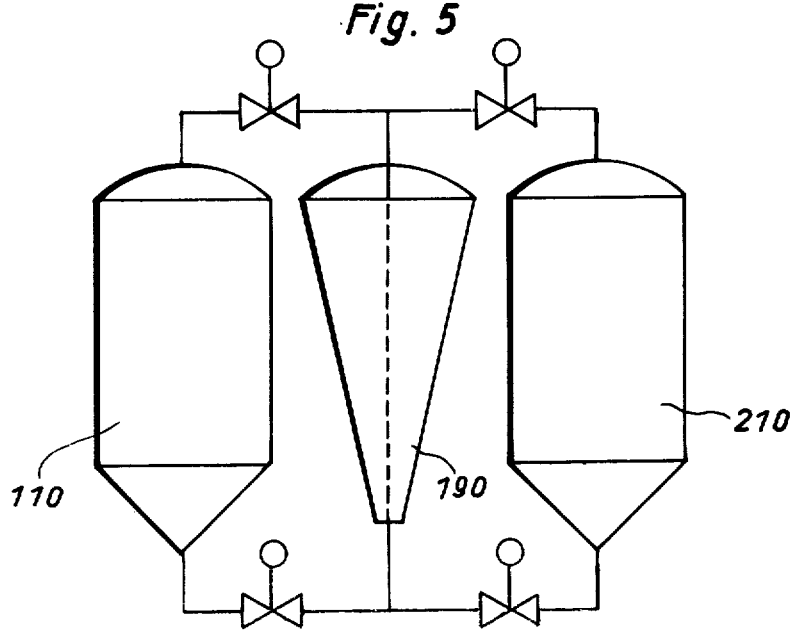
FIG. 5 shows the diagrammatic representation of a part of the installation in which two treatment columns are connected with one rinsing column.

In the following description of FIG. 3, like parts are provided with the same reference numerals as in the previous Figures. FIG. 3 shows the extension of the plant illustrated in FIG. 1 for the treatment of the adsorber material with suitable solvents in a cycle. The solvent is here recovered by working up. This installation is described as follows:

The dirt-laden batch of adsorber material which has descended in the funnel-shaped bottom part 10a of the treatment column 10 below the untreated water distributor 14 is introduced through the conduit 21 with the valve 22 open into an intermediate container 8 hereinafter called "measuring column". This measuring column is provided with a water supply conduit 23 through which, with the valve 24 opened and possibly through an ejector 5, rinsing and transport water is introduced and soiled water or relief water is conducted away through the conduit 6 with the valve 7 open. The batch transported with the valves 7, 34 and 22 open is measured as regards its volume in the measuring column 8 with the valve 105 closed. Then the valves 24, 26 and 105 are opened, the valves 7, 34 and 22 are closed and the batch situated in the measuring column 8 is fed to a rinsing column designated as a whole by 11. Chemical tanks 31, 32 are also connected to the water supply conduit 23, so that for the removal of mechanical impurities a rinsing of the adsorber material with suitable chemicals, for example acids or alkalis, can also be effected.

The rinsing column 11 is preferably made with conical upward widening in order to avoid discharge of the absorber material through the soiled water conduit 25 as a result of the sinking speed which is increased in comparison with the speed of rise. The rinsing column 11 is of such great volume that a batch of adsorber material occupies about half of the column, so that a thorough loosening and expansion of the adsorber material can take place in the rinsing process. The detached soiling substances are let off with the rinsing water through the conduit 25 by the valve 26.

After the rinsing process the valves 105, 24 and 26 are closed and the valve 38 is opened to free the transport conduit 37. By means of a dipping pipe 4 entering the rinsing column 11, on the admission of transport water through the conduit 37, the adsorber material is conveyed through a conduit 44, with valve 45 opened, into an extraction column for the elutriation of the adsorbed substances, which column is designated as a whole by 40. The transport water is let off through a conduit 46 by means of a valve 47 into an untreated water container (not shown) and the rest of the water is displaced with compressed air. The compressed air or the inert gas is admitted, possibly in the warmed condition, through a conduit 48 by a valve 49.

Then the treatment of the adsorber material takes place with the solvent which is admitted from the top into the extraction column 40.

In the extraction column an intimate intermixing of the solvent with the charged adsorber material takes place for the removal of the depositied soiling and suspended substances. After the treatment of the solvent is admitted into a first storage tank 61 for used solvent through a conduit 60 equipped with an air venting connection 65, with the valves 62, 63 and 64 opened. Thence the solvent is introduced into a distillation vessel 68 by means of a pump 67 through the conduit 76 with the valves 75 and 77 opened, for the purpose of purification. Here evaporation of the soiled solvent takes place, which can be effected electrically with a heating coil 69 or by the introduction of steam. Then the solvent is conducted in the vapour condition through the conduit 70 with the valve 71 opened into a condenser 72 and then condensed. This condenser is followed by a second storage tank 50 in which the purified solvent is stored in order to be conveyed back through the conduit 52 by means of the pump 51 into the extraction column 40 as necessary. The dirt and valuable substances forming in the distillation column 68 are conducted away out of the distillation column 68 through an outflow conduit 73 with the valve 74 open.

The procedure as described is intended for discontinuous operation when the solvent requires a relatively long time of action for the detachment of substances difficult to remove.

However the possibility also exists of constantly purifying the solvent and introducing it continuously into the extraction column. In this case the extraction column 40 is filled to overflowing with the purified solvent from the storage tank 50 through the conduit 52. The liquid level in the extraction column is indicated by an overflow 66. The overflowing solvent is admitted through the conduit 60 into the distillation column 68, there evaporated and supplied through the conduit 70 in vapour form to the condenser 82 where it is condensed and thence continuously introduced into the extraction column 40 through the conduit 84 with the valve 83 opened.

After the treatment of the adsorber material with the solvent, the solvent still present is displaced by admission of inert gas or warmed air through the conduit 48 with the valve 49 open. It is provided that the inert gas or air is purified for the purpose of re-use, which takes place in a condenser 54. Here the gas is freed of solvent by falling below the dew point, and fed through the opened valve 55 to a collecting container 56. The gas or air is here fed by the conduit 57 to a storage container (not shown) in order to be introduced if necessary into the extraction column again through the conduit 48. The soiled solvent leaves the tank 56 through the conduit 58 to the storage container 61 (conduit not shown).

When transport water is admitted through the conduit 85 with the valve 86 opened, the adsorber material situated in the extraction column is introduced through the conduit 87 with the valve 88 open into a washing column designated by 90, whereafter the admission of washing water through the conduit 97 with the valve 95 open it is washed. The washed-out solvent is let off through a conduit 91 controllable by means of a valve 92. Thence it passes through the conduit 46 into an untreated water container. Then the adsorber material is withdrawn from the column 90, for example by means of dipping pipes, and returned from above into the treatment column 10 through the conduit 19 with the valves 20 and 28 opened. In the introduction of the purified adsorber material batch, a brief cessation of operation occurs in which the untreated water flowing in through the conduit 12 is let off through the valve 28 at the filter bottom.

Directly before the admission of the batch through the conduit 19 it is expedient to admit a water current directed oppositely to the pure water current briefly from above downwards into the treatment column, in order thus to flush away dirt particles which have settled in the upper distributor and withdrawal system. This "shock flushing" is effected through the conduit 33 with the valves 34 and 28 opened.

By the described extraction of the adsorber material in a closed cycle by means of a continuously or almost continuously working filtration plant it is possible to work up liquids containing a relatively large quantity of organic compounds, for example phenols and derivatives thereof, organic dyestuffs, tensides, greases, oils, etc. Hitherto with the known processes it was not possible economically to work up such liquids by means of an adsorption filtration. Hitherto the adsorption material had to be discarded or reactivated by means of burning, or other heat treatment. The same applies to the other mentioned organic substances.

The process as described is very economical since the actual water requirement is not high and only little loss occurs due to the recovery of the solvent in a closed cycle. Moreover only a little solvent in all is required. For an adsorber material batch for example of 50 liters only about 50 liters of solvent are required. Thus the apparatus expense and the construction height of the columns can be kept within limits. The process is further harmless to the environment since the required solvent does not have to be discharged as in the case frequently with conventional processes, as a result of the recovery.

To increase the degree of separation of solids and organic contained substances, filtering aids such as kieselguhr, activated charcoal, asbestos, or flocculation media such as iron chloride, aluminium compounds or flocculation aids such as organic polyelectrolytes can be mixed into the liquid to be worked up with appropriate pre-mixing and suitable contact times. The effect of these additions may be seen from the accompanying graphs according to FIG. 2. The graphs I$a$ and II$a$ show results of a direct filtration of surface water (Neckar water) without addition of filtration aids, while in graphs I$b$ and II$b$ there is represented the filtration effect in the case of addition of a filtration aid (25 g. of kisselguhr per cubic meter). On the ordinates under I there is indicated the suspended substance content in mg/l and under II the $KMnO_4$ consumption in mg/l. On the abscissae there are indicated the filtration performance in cu.m/h and beneath that the filtration speed in m/h. From the curve I$a$ it may be seen that the suspended substance content in the filtrate descreases with the increasing filtration speed (chain line) and reaches a minimum of 25 m/h. This effect is based upon the increase of the solid bed proportion of the filter bed charged from beneath with rising speed of filtration. On further increase of the filtration speed the suspended substance content in the filtrate increases again, since then the suspended substances are forced through the filter bed. With the conventional filtration processes hiterto the direct filtration was not possible with the stated speed of filtration in the case of high proportions of suspended substances in liquids. Moreover the apparatus expense for carrying out these processes was substantially higher.

From the graphs it may be seen that by the addition of a filtration aid (curve I$b$) an improvement of the residual suspended substance content in the filtrate is achievable both at lower valves and at valves lying above the above-mentioned filtration speeds. A nearly constant purification effect is achieved even at great filtration speeds. In the case of conventional filters such a process cannot be exploited since the additional solid loading leads to a considerable shortening of the life of the filter.

The curves II$a$ and II$b$ show the $KMnO_4$ consumption in mg/l. By measurement of the $KMnO_4$ consumption one can ascertain the content of oxidisable organic substances especially in inorganic aqueous solutions free from reduction agent. The $KMnO_4$ consumption in the filtrate (curve II$a$) shows the same dependence upon the filtration speed as the suspended substance content. Due to the addition of filtration aids the curve II$a$ likewise flattens off (see curve II$b$). The $KMnO_4$ consumption of the filtrate is reduced similarly to the residual suspended substance content. The degree of separation of the filter is increased by addition of flocculation aids and thus the quantity of suspended substances and organic content substances in the filtrate is reduced. For the sorption process this signifies an increase of yield related to the organic contents to be removed.

Even in the case of heavily soiled waters a batch of the adsorption material is let off only after one hour at the earliest. In special cases, as for the reduction of the chlorine requirement in the disinfection in the backflushing column, by flushing in counter-current in the treatment column a larger part of the soiling substances can already be discharged there.

It has proved expedient to use as adsorber material a granulated material having a grain size of about 0.6 – 2 mm. diameter. Thus a filtration in depth or multistratum filtration can be achieved. Due to the different grain sizes and the different specific weights of the adsorption mass, a stratification of the filter substances is obtained from the entry side to the pure water side from coarse to fine grains. Thus a three-dimensional filtration is achieved whereby the dirt-absorption capacity can be increased substantially. In the case of larger installations it can be expedient to connect several treatment columns with one signal rinsing column, as represented diagrammatically in FIG. 3. Here a single rinsing column 190 is connected with two treatment columns 110 and 210 through conduits in each of which valves are placed. The rinsing column 190 is operated so that the adsorption batch is taken up from the one treatment column only when the flushed batch from the other treatment column has travelled back again into the latter. It can be seen that the interruption of operation of the treatment column in the case of a plant of one treatment column and one single rinsing column amounts to 100%, in the double assemblage 50%, in the treble assemblage 33% and in the quadruple assemblage only 25% of the necessary rinsing time per rinsing cycle. If continuous operation must be guaranteed, the cycle times are bridged over by a series-connected blast-pressure tank, which can be of correspondingly smaller dimensions in the case of multiple assemblages.

In the practical operation of the installation as described it has appeared that for many purposes it is favourable if the volume of adsorber mass withdrawn could be varied. According to the selection of the adsorber mass utilised, which can also consist of ion exchanger resins, a swelling occurs during operation in the order of magnitude of 5–20%. For this reason it is expedient if the withdrawn volume in the washing column can be set slightly greater than in the treatment column. Thus pressing of the adsorber mass in transport is avoided and the swelling and shrinkage can be compensated to a certain extent.

The variation of the withdrawal space is also advantageous if no constant water conditions are present and the withdrawal of the adsorber or exchanger mass from the treatment column is controlled by the degree of purity. If for example the batch was so calculated that in the case of a salt content of the water to be worked up of 10 mval/l the batch volume to be withdrawn amounts of 40 liters, then this volume rises to 44 liters in the case of a rise of the salt content to 11 mval/l. This variation of the mass to be withdrawn could be compensated hitherto only by variation of the cycle time. However it would be simpler if in such a case one could also influence the volume of the batch. In order to achieve this without great difficulty it is provided that the volume-adjustment devices are adjustably and securably arranged on at least one pipe extending from the exterior into the columns or within at least one pipe. Such constructions are represented in FIGS. 6 -10. The liquid to be worked up enters through the conduit 11' and leaves the treatment column as pure product through the conduit 13'. The adsorber or exchanger mass lowered into the funnel-shaped bottom space 12' is introduced through the conduit 16' into a washing column 20' and conveyed back through the conduit 26' into the head part of the treatment column 10'.

Figure 6:
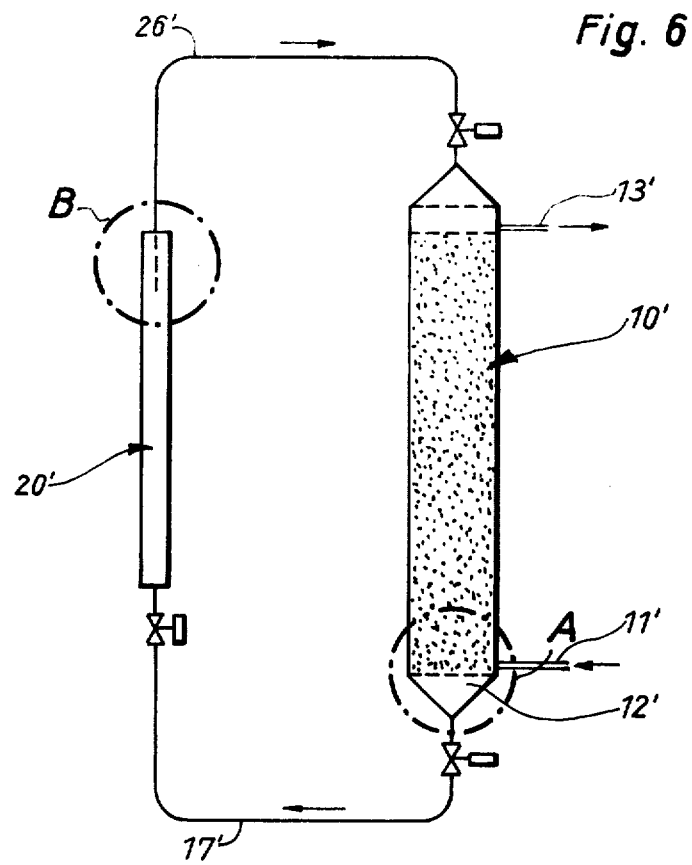
FIG. 6 shows a diagrammatic reproduction of the installation according to FIG. 1.
Figure 7:
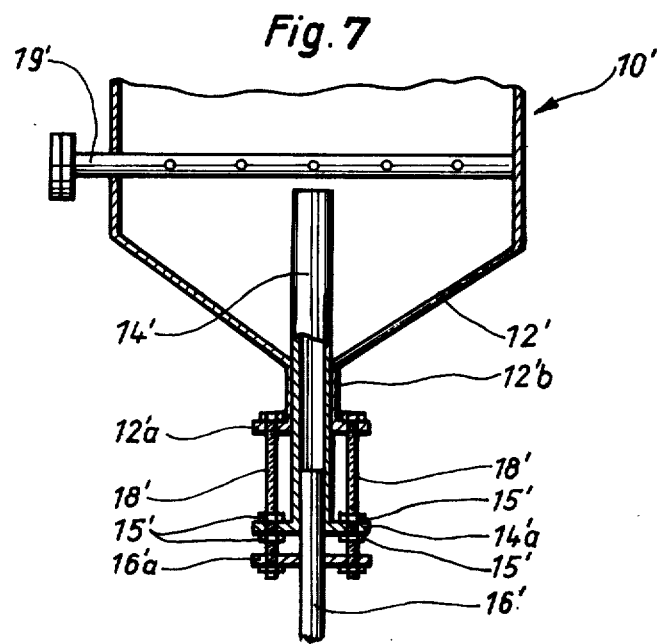
FIG. 7 shows a detail of the part of the installation indicated by a circle A in FIG. 6.

Both in the withdrawal space of the treatment column, which is indicated in FIG. 6 by the circular area A, and in the head part of the washing column which is indicated by B in FIG. 6, there are provided adjustable volume-adjustment devices by which the volume of the batch can be determined and varied. In the example of embodiment according to FIG. 7 a pipe 14' is telescopically guided within an output connection 12'b on the funnel-shaped bottom part 12' of the treatment column 10'. The output connection has at one end an outwardly extending flange 12'a in which two mutually diametrically opposed threaded spindles 18' are held.

These threaded spindles in turn pass through a flange 14'a of the telescopic pipe 14' and are held therein by threaded nuts 15'. By adjustment of these threaded nuts and corresponding displacement of the telescopic pipe 14' within the connection 12'b the dipping level of the pipe in the bottom space beneath the untreated water distributor 19' can be varied. In the telescopic pipe 14' a further pipe 16' is rigidly arranged, which is the transport conduit. This pipe is likewise connected with the adjusting device 18' by means of a flange 16'A.

In the example of embodiment according to FIGS. 8 and 9 an annular body 44' is adjustably arranged in the bottom space of the treatment column designated as a whole by 40'. This annular body has bores 44'a for the exit of the untreated water. The adjustment of this annular body within the treatment column is effected by two telescopically guided pipes 46' and 48' which are adjustably guided in eccentrically arranged connections 42'b and 42'c provided specifically for this purpose, in the same way as was described in connection with FIG. 7. The transport pipe 16' is inserted in the central outlet connection 42'a of the container 40', while the untreated water is admitted through the pipes 46' and 48'.

In FIG. 10 there is shown a head part of a washing column. The determination of volume is here effected by a dipping pipe 24' centrally guided in the head part and having a flange 24'a with which the pipe 24' is displaceable within a connection 27'. Bores for the reception of threaded spindles 28' are provided in the flange, the one end of each of which spindles is held stationarily in the head part 22' while the other end, passing through a flange 27'a of the connection 27', is held in a flange 26'a of a transport pipe 26'. The adjustment of the dipping pipe 24' is by slackening of the threaded nuts 25' and displacement by means of the flange part 24'a. After the desired dipping depth is reached the nuts 25' are tightened. In the head part of the column 20' a connection 22'a for the admission of the transport water is provided which conducts the adsorber or ion exchanger material, situated in the head part as far as the depth of immersion, through the conduit 26' to the treatment column. Between the head part and the cylindrical part of the column 20' there is a nozzle plate 30' in which bores 30'a are provided for the reception of filter nozzles.

As may be seen, a simple adjustment is possible by operation of the nuts and displacement of the pipes. If the columns possess a greater extent it is expedient if two or more telescopic pipes are provided. Thus by way of example it has proved expedient to arrange three insertion pipes in the head part of a washing column according to FIG. 10 in the case of the diameter as from 400 mm.

We claim:

1. Apparatus for separating solid substances from liquids comprising a treatment column containing a bed of treatment material, a solvent extraction column, a washing column, means for intermittently removing successive volumes of said material from the lower end of the treatment column and conveying said material into said solvent extraction column, means for removing portions of said material from said solvent extraction column and conveying said portions to the lower end of said washing column, means for intermittently removing successive volumes of said materials from said washing column and conveying said material to the upper end of said treatment column, means for supplying untreated liquid to the lower end of the treatment column, means for removing purified liquid from the upper end of the treatment column, means for supplying washing liquid to the lower end of the washing column, means for removing used washing liquid from the upper end of said washing column, said treatment column, solvent extraction column and said washing column and all said means being connected to form a closed system for said treatment material and means for supplying solvent to the solvent extraction column, means for removing used solvent from the solvent extraction column, volume-adjustment devices which comprise pipes protruding respectively into the treatment and washing columns and adjustable depthwise therein for adjusting both said volumes removed from the treatment column and from the washing column, said volume adjustment devices being formed as telescopically guided pipe and pipe connection devices provided on the treatment and washing columns coupled to each pipe, said volume-adjustment device of the treatment column being formed as a hollow annular body located within the treatment column, said body openings therein and being in fluid connection with two pipes engaging the annular body at diametrically opposite positions, said pipes extending out of the treatment column and being adjustable as to height within the treatment column.

\* \* \* \* \*